United States Patent
Torres et al.

(10) Patent No.: US 9,254,066 B2
(45) Date of Patent: Feb. 9, 2016

(54) ACCESSIBLE BATHTUB AND DRAIN (75) Inventors: Raymond C. Torres, Moreno Valley, CA (US); Jason Slepicka, Huntington Beach, CA (US)

(73) Assignee: Aquatic Co., Anaheim, CA (US)

(*) Notice: Subject to any disclaimer, the term of this patent is extended or adjusted under 35 U.S.C. 154(b) by 854 days.

(21) Appl. No.: 13/446,590

(22) Filed: Apr. 13, 2012

(65) Prior Publication Data
US 2012/0192349 A1     Aug. 2, 2012

Related U.S. Application Data

(62) Division of application No. 12/432,543, filed on Apr. 29, 2009, now Pat. No. 8,230,534.

(51) Int. Cl.
A47K 3/02     (2006.01)
A47K 3/00     (2006.01)
E03B 1/04     (2006.01)

(52) U.S. Cl.
CPC ............... *A47K 3/006* (2013.01); *E03B 1/042* (2013.01); *E03B 2001/045* (2013.01)

(58) Field of Classification Search
CPC ............................... A47K 3/006; A47K 3/02
USPC ...................... 4/555, 556, 679, 688
See application file for complete search history.

(56) References Cited

U.S. PATENT DOCUMENTS

| | | | |
|---|---|---|---|
| 2,510,023 A | 5/1950 | La Barre | |
| 3,864,762 A | 2/1975 | Finch et al. | |
| 4,045,346 A * | 8/1977 | Swaskey | 210/164 |
| 4,099,272 A | 7/1978 | Sowder | |
| 4,371,995 A * | 2/1983 | Donhauser | 4/538 |
| 4,546,506 A | 10/1985 | Houle et al. | |
| 4,583,251 A * | 4/1986 | Furst et al. | 4/555 |
| 4,890,341 A | 1/1990 | Forbes | |
| 4,953,241 A | 9/1990 | Williams | |
| 5,056,169 A | 10/1991 | Roguebrune | |
| 5,163,187 A * | 11/1992 | Dannenberg et al. | 4/556 |
| 5,220,696 A | 6/1993 | Dannenberg et al. | |
| 5,255,400 A | 10/1993 | Sween | |
| D355,245 S | 2/1995 | Sills et al. | |

(Continued)

FOREIGN PATENT DOCUMENTS

DE     3508713 A1     3/1985
EP     0787456 B1     8/2000

OTHER PUBLICATIONS

Aquassure Bath Products Inc., "Accessible Bathtubs for Independent Living," at http://www.aquassure.com/ and http:/www.aquassure.com/doorandseal.html, last accessed on Jun. 5, 2008.

(Continued)

*Primary Examiner* — Huyen Le
(74) *Attorney, Agent, or Firm* — Sean D. Senn; Archer Norris, PLC (57) ABSTRACT

A bathtub system, including a tub with a bather access opening in one sidewall and a door mounted on that sidewall. In the closed position, the door is adjacent the access opening, and in the open position the door is substantially clear of the access opening. The system includes a gray water reservoir under the tub of approximately the capacity of the tub and which can be connected to a sewer system. A high capacity toroidal tub drain conducts water from the tub into the reservoir by gravity alone very quickly.

8 Claims, 7 Drawing Sheets

(56) References Cited

U.S. PATENT DOCUMENTS

| | | | |
|---|---|---|---|
| 5,446,929 A | | 9/1995 | Sills et al. |
| 5,458,769 A | * | 10/1995 | Johannessen ............... 210/163 |
| 5,701,614 A | | 12/1997 | Appleford et al. |
| 5,978,983 A | | 11/1999 | Queen et al. |
| 6,014,780 A | | 1/2000 | Jurek et al. |
| 6,381,769 B1 | | 5/2002 | Lofquist, Jr. |
| 6,484,329 B1 | * | 11/2002 | Duncan ............................ 4/671 |
| D511,567 S | | 11/2005 | Beahn |
| 7,237,276 B2 | | 7/2007 | Longman |
| D573,700 S | | 7/2008 | Clarke |

OTHER PUBLICATIONS

Arjo Inc., "Freedom Bath," Brochure printed in Denmark, 01.AF.01-US9911.

The Bathtub Doctor, "Safety Bath Comparisons," at http://thebathtubdoctor.com/safetybathcomparisons.html, and "Frequently Asked Questions," at http://thebathtubdoctor.com/faqs.html, last accessed on Sep. 13, 2007.

Paugh, Bob and Sterry, Ken, "Designing with Inflatable Seals," Machine Design, Mar. 9, 2006.

* cited by examiner

ACCESSIBLE BATHTUB AND DRAIN

CROSS REFERENCE TO RELATED APPLICATIONS

This application is a division of U.S. Patent Application Ser. No. 12/432,543, filed Apr. 29, 2009, now U.S. Pat. No. 8,230,534 issued Jul. 31, 2012, the entirety of which is hereby incorporated by reference.

BACKGROUND OF THE INVENTION

1. Field of the Invention

This invention relates generally to an elevated bathtub with a slide-down door for easy access by individuals with disabilities, more particularly to an accessible bathtub with an annular-flow drain and a waste reservoir, and also specifically to an annular-flow, toroidal drain with a U-shaped flow passage.

2. Description of the Prior Art

Accessible bathtubs have been designed for easy access by people who are confined to wheelchairs, disabled, or the like.

Representative of the art is U.S. Pat. No. 5,701,614.

Also representative of the art is U.S. Pat. No. 5,446,929.

SUMMARY

The present invention is directed to systems and methods which provide a rapid-draining, accessible bathtub. A person requiring an accessible bathtub generally cannot leave the tub after bathing until the tub has fully drained and the door is then opened. Conventional tub draining systems take too long to drain, resulting in a chilling experience for the bather. The present invention provides quick bathtub draining which minimizes or prevents chilling of the bather. Embodiments of the invention provide a system that can be installed with conventional sewer lines, conventional water supply, conventional electrical supply, and conventional alcove dimensions and materials. Embodiments of the invention also provide a tub with no conventional drain holes or overflow holes cut in the bottom or sides, respectively.

The present invention is directed to a bathtub system, herein just called the "bathtub," including a tub having four sidewalls, a bottom, and a typical water capacity for bathing. There is a bather access opening in one sidewall and a door mounted on that sidewall. In a closed door position, the door is adjacent the access opening, i.e. substantially blocking the access opening, and in an open door position the door is substantially clear of the access opening. The bathtub includes a gray water reservoir having a volumetric capacity approximately the water capacity of the tub, a reservoir drain opening for connection to a sewer system, and the reservoir disposed lower in elevation than the tub. A tub drain may include a drain opening to the tub and a drain passage that conducts water from the tub and into the reservoir by gravity and may include a reservoir inlet opening. The reservoir drain opening may be a conventional drain opening, thus preventing the bathtub from exceeding the sewer flow capacity.

Embodiments of the invention are directed to a bathtub in which the drain passage has at least a portion with a water-retaining U-shaped cross section, which may retain a water barrier, for example, to prevent odors from escaping the reservoir. Preferably the tub drain has a flow capacity sufficient to drain the tub into the reservoir in less than about 2 minutes, or in 10-60 seconds, or less than 30 seconds, in order to avoid prolonged chilling effects for the bather during draining.

Embodiments of the invention may further include a gutter disposed under the door to catch water leaking from the tub around the door or water running off or down the door when opened, and a gutter drain connection may be included between the gutter and the reservoir or for direct or indirect connection to a sewer line. Alternately, a gutter or drip tray may be attached to the bottom of the door. The door may advantageously be opened by sliding downward to a position where the top edge of the door is substantially level with the bottom of the tub when in the open position. The door may slide downward into the gutter Suitable guide rails, or hinges or the like may be provided.

Embodiments of the invention include at least one bidirectional door actuator operationally connected to open and close the door or to raise and lower the door. A door safety closure may also be included, such as a spring device or latch, in order to prevent the door from opening or lowering under gravity and/or water pressure alone.

The invention is also directed to a bathtub wherein the tub drain is a sheet-flow drain. The sheet-flow drain may be a linear drain in the form of an elongated slot with a length many times its width or an annular drain in the form of an annular slot. The drain passage may include a water-retaining U-shaped cross-section portion.

Embodiments of the invention are directed to a bathtub with a gap between the door and the tub when the door is in the closed position, and the gap may serve as a linear drain opening. A primary door seal may seal the door and the drain at the same time. A secondary seal may be used to prevent leaks and/or help direct the draining water into the reservoir. The two seals may also provide an overflow channel. The seals may be in the form of inflatable seals, lip seals, wiper seals or rigid seals or a combination thereof. The drain passage may include a portion passing between the two seals.

The invention is also directed to a method of using embodiments of the inventive bathtub system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The invention is directed to a bathtub with a door in a side for mobility and access. A problem with accessible tubs is that the bather has to be in the tub with the door closed during filling and draining of the tub. Although, getting into the tub and filling with warm water is slow, it is not that uncomfortable because the bather's exposed skin can remain dry. However, during draining of the conventional tub the bather is generally quite wet with increasing amounts of wet skin exposed to the air, resulting in chills or even painful cold while waiting for the tub to drain before opening the door.

Embodiments of the present invention provide apparatus and methods for accessing a tub, sealing a door and/or an access opening of an accessible tub, and quickly draining a tub to avoid excessive waiting by a bather.

In embodiments of the invention, access is provided by a door and an opening in a sidewall of the tub. The door may be powered so that it easily opens and closes. The door may advantageously move vertically, downward and upward in guide rails or tracks and without need for manual or automatic latches, although latches may be used. Automatic controls may be used and may incorporate fail-safe logic to prevent opening the tub when full of water or other mishaps. Water sensors may be included as needed, for example to detect the presence and/or level of water in the tub, reservoir, or other portions of the system. The door may be operated in any way known in the art, with motors, gears, levers, hydraulic actuators, pneumatic actuators, springs, and/or the like in various combinations. In embodiments of the invention, hydraulic cylinders or electromechanical actuators may be combined with safety closures to prevent opening under gravity alone on loss of power. Examples of suitable safety closures include spring devices and mechanical latches. Spring devices include coil springs, gas springs, and the like.

In embodiments of the invention, the access opening is sealed so that the tub will hold water during bathing. The seal may be located between the door and a surface of the tub. An inflatable seal may be used. The tub drain also requires a closure mechanism which can be activated and deactivated for tub filing and draining. As will be seen, in preferred embodiments the same seal may be used for both door seal and drain closure when a gap between the door and the tub serves as the primary drain opening. A secondary seal may be used advantageously in such a system as will be described further below.

Rapid draining is accomplished by draining the tub through a relatively high-capacity tub drain opening, through a comparable tub drain passage into a gray water waste holding reservoir located preferably under the tub. The high capacity tub drain is preferably a "sheet-flow" drain, so named because the water flows through the drain in a relatively wide, thin sheet instead of the conventional tube or cylindrical flow. In various embodiments of the invention, the tub sheet-flow drain may be a linear drain and have a linear or elongated slot opening in the bottom of the tub or in a side wall of the tub. The elongated slot need not be straight, but may have bends or curves, for example following the shape of the tub bottom. The elongated slot may even curve back on itself in a closed loop, forming an annular opening in the tub bottom. Thus, the sheet-flow drain may be an annular drain with annular-flow. The tub drain passage may include a tortuous flow channel or passage that retains some water and creates a fluid barrier between the tub and the reservoir. Two preferred tub drain designs based on sheet-flow will be described in various embodiments of the invention: a linear drain and an annular-flow or toroidal-flow drain. The reservoir may drain at an ordinary flow rate through a conventional drain, P-trap, or the like into a sewer system. A conventional drain is typically a round hole and associated pipe of nominal 1.5- or 2-inch diameter. An advantage of the dual drain design with a high-capacity tub drain and a conventional reservoir drain is that the sewer flow capacity, if properly sized for a conventional tub drain, cannot be exceeded.

Figure 1:
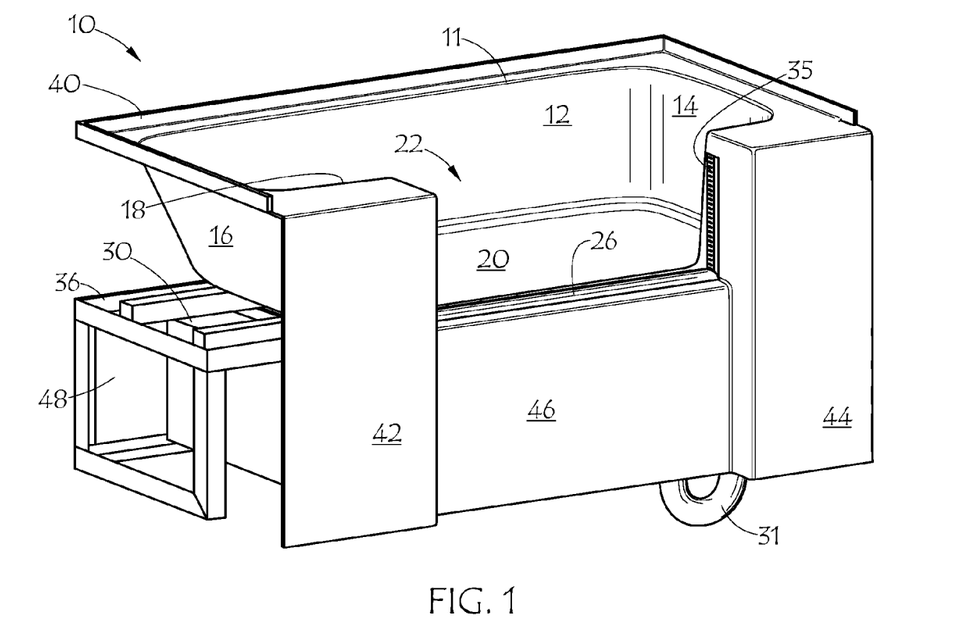
FIG. 1 is a perspective view of an embodiment of the invention.
Figure 2:
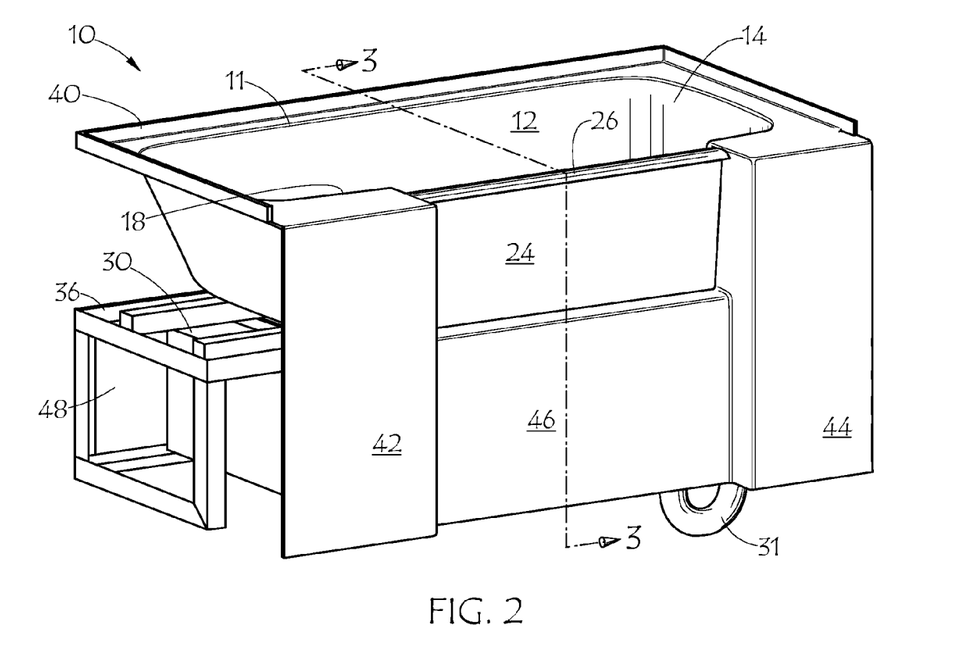
FIG. 2 is another perspective view of the embodiment FIG. 1.

FIGS. 1 thru 4 show an embodiment of the present invention from various perspectives and with door 24 in various positions. Referring first to FIGS. 1 and 2, accessible bathtub 10 includes tub 11 resting on frame 36 over gray water reservoir 30. The tub must be higher in elevation than the reservoir for draining by gravity alone. Tub 11 includes four sidewalls 12, 14, 16, and 18, and tub bottom 20. Around the top edge is flange 40 to facilitate permanent installation in a walled alcove. Sidewall 18, closest the viewer, has large, bather-access opening 22. Access opening 22 amounts to a complete central section of sidewall 18 missing. Door 24 opens vertically downward such that top edge 26 is approximately flush with tub bottom 20 and therefore also approximately flush with the bottom of opening 22. FIG. 1 shows door 24 in the open position in which the door is substantially clear of the access opening. In the open position, opening 22 and door 24 thus allow easy access to the tub. For example, a bather could just sit on the edge of the opening, scoot back into the tub, and swing in their legs. The tub 10 may be mounted on frame 36 at a height that facilitates such easy access. By way of example, the tub bottom may be at standard wheel chair height for easy transfer of a bather from a wheel chair, through the opening, into the tub.

Figure 3:
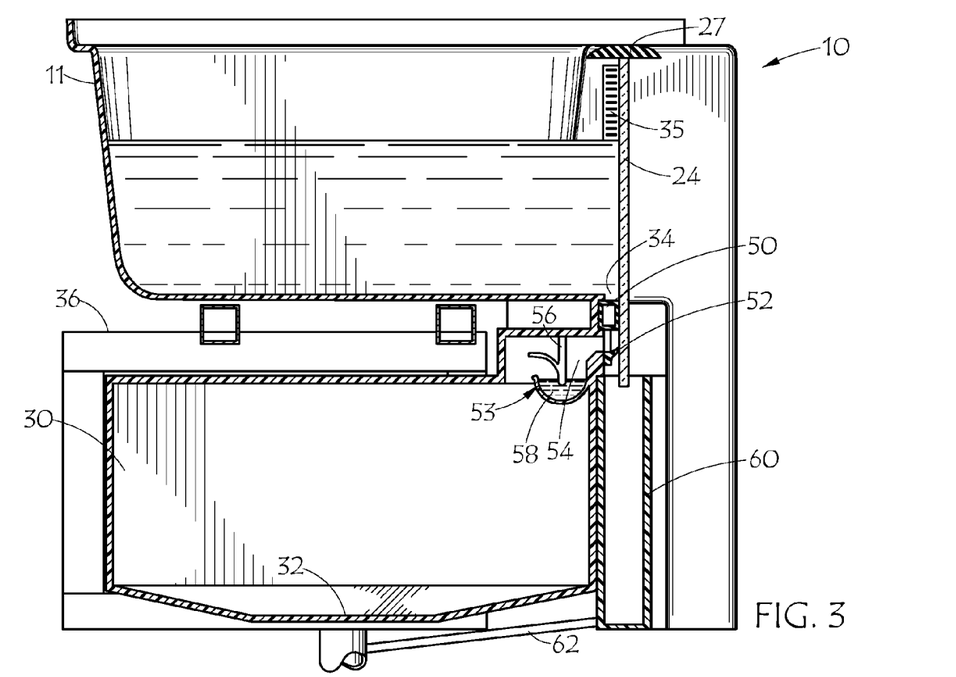
FIG. 3 is a partially fragmented side view of a section along line 3-3 in FIG. 2.
Figure 4:
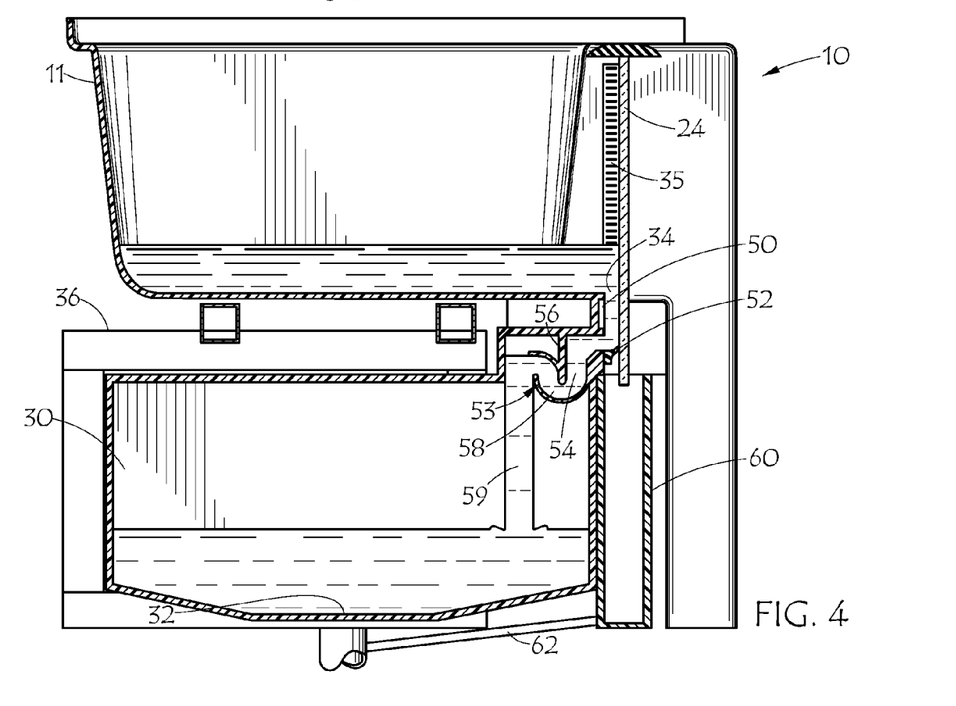
FIG. 4 shows the embodiment of FIG. 3 in a different state of operation.

Door 24 may be mounted to the side of the tub and operated in its associated tracks or guides by an actuator or by a pair actuators located on each lateral edge of the door or on a face of the door near each lateral edge, according to various embodiments of the invention to be discussed later. In FIGS. 1 and 2, such mechanisms are hidden behind decorative panels 42 and 44. Likewise door 24 in the open position is hidden behind panel 46. Such panels may be integrally molded as a single part. FIGS. 2, 3 and 4 show door 24 in the closed position. In the closed position, door 24 substantially covers, blocks, or fills access opening 22, being positioned either adjacent the opening preferably outside the tub or within the opening. Space 48 may be provided for accessories such as a circulation pump, an air blower, a seal inflator, and the like, which will be addressed later.

A primary advantage of the present invention, i.e., rapid draining, is provided by tub drain opening 34, visible in FIGS. 3 and 4, in combination with gray water reservoir 30. In the embodiment of FIGS. 1-4, tub drain opening 34 is in the form of an elongated slot. The slot drain opening may optionally have a grate, grating or screen covering it. The embodiment of FIGS. 1-4 has slot-shaped drain opening 34 extending across the bottom of the opening 22 and up the sides of opening 22 covered with grating 35 having a series of transverse slot-shaped holes. Any desired grating hole pattern may be used as long as the open area of the grating is sufficient to provide a high rate of water drainage flow from the tub under gravity alone. This high rate of drainage flow is directed through drain opening 34 into gray water reservoir 30 under tub 11. Reservoir 30 has sufficient volumetric capacity to hold all the bath water which may be used in tub 11. In addition to the inlet to the reservoir, reservoir 30 has as an outlet reservoir drain opening 32 which may be connected in the ordinary way to a sewer pipe or sewage system, for example, with P-trap 31. Reservoir 30 may also have provision for a vent pipe connection (not shown). Reservoir 30 may also have provision for clean out access to the sewer line (not shown). Other than these plumbing connections, the reservoir may advantageously be a closed container in order to prevent spillage of gray water or to minimize fumes or odors.

The drain opening has a drain closure mechanism which may be manually operated or automatic. The drain closure seals off the drain so the tub can be filled with water. The drain closure can be opened to rapidly drain the tub. In a preferred embodiment of the invention, the drain closure mechanism includes an inflatable seal. A seal inflator (not shown) may include a pneumatic pump to supply pressurized air to the seal to inflate it and close off the drain for filling and bathing. A control panel can provide a user interface and controls for operating the drain closure mechanism based on user input and/or water sensor signals.

The function of the elongated slot drain or "linear" drain illustrated in the embodiment of FIGS. 1-4 is best viewed in FIGS. 3 and 4. FIG. 3 shows door 24 in the up or closed position and drain opening 34 closed or sealed with stopper 50 in the upper portion of the drain passage. The lower portion 54 of the drain passage leads to a U-shaped portion 53 with central dividing portion 56. U-shaped portion 53 thus retains water 58 and prevents odors from reservoir escaping to the tub through the drain passage. Stopper 50 may be an elongated tubular rubber structure with sealed ends, except for openings for connecting to inflator equipment, called an "inflatable seal" herein. Stopper 50 may also be the primary door seal which fills the gap between the door and the sidewall of the tub around the access opening. In FIGS. 3 and 4, stopper 50 extends in a U-shape along the bottom of the access opening and up the sides of the access opening, but not quite as high as the top of the door or rim of the tub. Thus, if the tub is overfilled with water, excess water will first run out over the top ends of the inflatable seal and not over the rim of the tub or the top of the door. Secondary seal 52 is a wiper-type seal that continually presses against door 24. Secondary seal 52 also extends in a larger U-shape parallel to the primary seal but below and outside it. Thus, with both primary and secondary seals mounted on the front face of the tub, there may be a space or channel in between them which can function as an overflow channel. The secondary seal extends up the sides at least as high and preferably higher than the primary seal. The channel formed there between directs excess water which happens to flow over the ends of the primary seal down toward the reservoir.

FIG. 4 shows door 24 in the closed position while tub 11 is being drained into reservoir 30. Inflatable seal 50 is shown in its natural deflated configuration, no longer blocking upper portion 64 of the drain passage. Secondary seal 52 is still pressed against door 24. When the primary seal is first deflated, water flowing down into upper portion 64 of the drain passage from the tub is deflected or directed by secondary seal into the lower portion 54 of the drain passage, through the U-shaped portion 53 if present, and then down into reservoir 30 as shown by water stream 59 in FIG. 4. During draining the door remains in the closed position and the secondary seal prevents water from escaping the bathtub.

After the tub is quickly drained in the reservoir, the reservoir may drain into a sewer system through reservoir drain opening 32. A target draining time for an accessible bathtub is for the tub to drain into the reservoir in about two minutes or less. A draining time of 10 to 60 seconds may be desirable. In embodiments of the invention, a drain time less than 30 seconds may be advantageous. Faster is better for preventing the chilling effect on the bather. Faster draining can be achieved by increasing the size of the tub drain opening and/or the cross-sectional flow area of the associated drain passage. However, a drain time less than about 10 seconds may result in some negative effects, like surprise or fear on the part of the bather, or significant forces pulling the bather toward the drain opening. Since the tub drain is so much faster than the reservoir drain, which is conventional drain, the reservoir should preferably be about the same volumetric capacity as the tub. The reservoir could be a little larger capacity to prevent overflow should the reservoir drain get plugged. The reservoir could be a little smaller in capacity than the tub since it will begin draining as soon as the tub drains, although at a slower rate. While any tub and/or drain capacity and/or flow rate could be designed according to the invention, for a typical tub size about five feet long, a flow area of about 20 to 30 square inches may be advantageously used and/or a flow rate of about 0.5 to about 5 gallons per second, preferably about 1 to 3 gallons per second, may be used.

As shown in the embodiment of FIGS. 3 and 4, door 24 may lower into gutter 60, which may be provided to catch water that might leak through a seal and/or run down the door. Gutter 60 may have a gutter drain line 62 to direct water from the gutter to the reservoir or directly to a drain line as shown in FIG. 3.

It should be noted that water stream 59 produced in the linear drain of the embodiment of FIGS. 1-4 is in the form of a sheet of water, not a cylindrical stream. A linear drain may be described as a slot or elongated drain opening, generally much longer, or many times longer, than it is wide. It may be located in the bottom of the tub, running lengthwise or widthwise relative to the tub. It may be located at the bottom of a sidewall or end wall, or at the intersection of the tub bottom and a sidewall or end wall. A preferred location for a linear or slot drain is in the tub bottom along the edge of the access opening as shown in the embodiment of FIGS. 1-4. The slot may continue up the sides of the access opening as also shown in the embodiment of FIGS. 1-4. Bolster 27 on top of the door can hide the drain opening when the door is in the fully open position as illustrated in FIGS. 1 and 4. The flow of water from the tub through the linear drain into the reservoir is in the form of a sheet of water. Therefore, this kind of tub drain is also called a type of sheet-flow drain herein. The tub drain may provide relatively direct flow from the tub to the reservoir, e.g., such as simple aligned, matching openings through the tub bottom and the top of the reservoir with a very short, straight passage of comparable size and shape directly connecting the two. The sheet-flow may include a free-falling portion and/or may fill an elongated channel, and/or follow a surface. The drain passage may include a more tortuous passage, such as a U-shaped section, which may retain some water as a barrier to fumes. It should be understood, that the drain passage generally has a "flow cross-section" (i.e., a cross-sectional area or shape perpendicular to the general direction of flow) that is comparable in shape and area to the drain opening from the tub. This provides maximum water flow rate for draining the tub, or least minimal restriction of the sheet flow. By "comparable size and shape" is meant not necessarily exactly the same, but close enough to the same size and shape for generally smooth transitions or connections there between and for substantially equal water flow capacity there through. Thus, a tortuous passage may be slightly larger in flow cross section to compensate for friction losses from the turns and thus still be "comparable in size and shape" to a drain opening. Likewise a passage lower in elevation than the drain opening may be slightly smaller in flow cross section and still have substantially the same throughput due to gravitational acceleration.

A sheet-flow drain has a number of advantages over a conventional drain based on a hole in the tub. To increase the flow rate of a hole merely takes a bigger hole, but the flow is concentrated in the location of the hole, producing strong suction, a vortex and the like. A sheet-flow drain has a long dimension that is much greater than the diameter of a hole of the same capacity, thus spreading out the suction effect over a larger area of the tub. This results in a much gentler draining action, with minimal vortex formation. On the drain-side, to include a U-shaped section under a conventional drain hole requires a curved pipe of the same diameter as the hole, which can be exceedingly bulky for a high-capacity conventional drain. In contrast, the sheet-flow drain permits a U-shaped section to be based on the thickness of the sheet, resulting in a highly compact drain design. The high flow rate is based on the long length of the opening, i.e. the width of the sheet, while maintaining a reasonable thickness of the sheet, based on the width of the opening.

Figure 5:
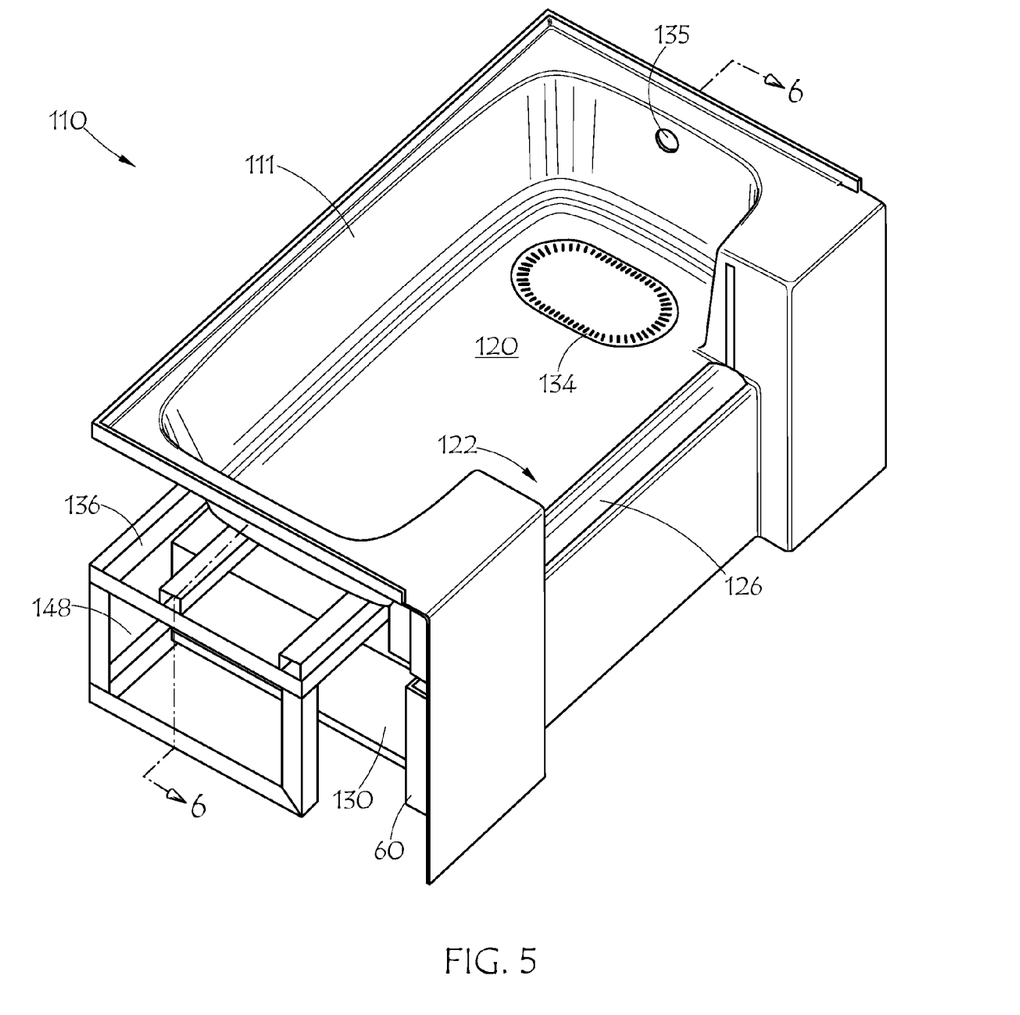
FIG. 5 is a perspective view of another embodiment of the invention.
Figure 6:
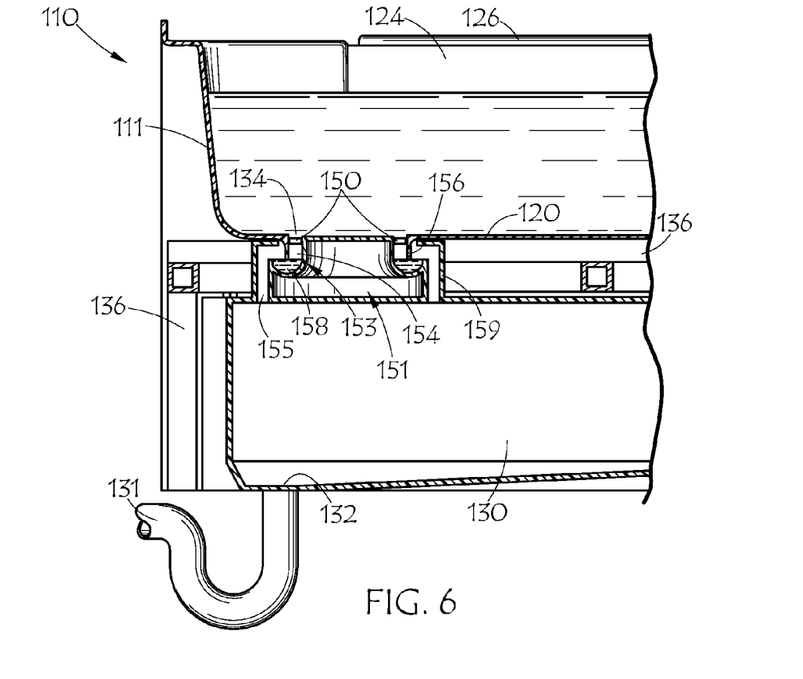
FIG. 6 is a partially fragmented rear view of a section of the embodiment of FIG. 5.
Figure 7:
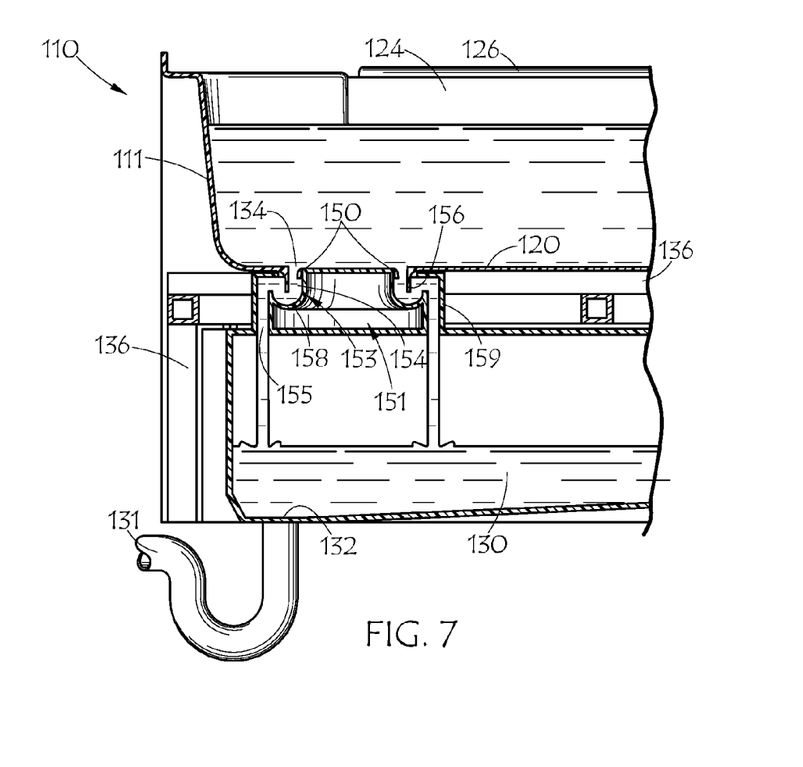
FIG. 7 shows a different state of operation of the embodiment of FIG. 6.

A second embodiment of the invention is shown in FIGS. 5-7. This embodiment includes the second type of sheet-flow drain design mentioned earlier, namely, an annular-flow drain. FIG. 5 shows accessible bathtub 110 includes tub 111 resting on frame 136 over gray water reservoir 130. The tub must be higher in elevation than the reservoir for gravity draining. Tub 111 includes four sidewalls and tub bottom 120. One sidewall has a large, bather-access opening 122. Access opening 122 occupies a complete central section that one sidewall. Door 124 opens vertically downward such that top edge 126 is approximately flush with tub bottom 120 and therefore also approximately flush with the bottom of opening 122. The door may have a primary and/or secondary seal, but need not have both, since the drain opening is not adjacent the door and the drain passage does not follow the door in this embodiment. FIG. 5 does include gutter 60 under the door. The drain opening is in the bottom of the tub in a more conventional location near one end of the tub. This embodiment has conventional overflow opening 135 in one sidewall of the tub. In this embodiment, drain opening 134 has an annular shape and is again covered with a grating having a large number of holes in the form of transverse slots. Although the annular drain opening 134 is shown with an oval or flattened circle shape, it is envisioned that any annular shape providing sufficient open flow area may be used. The annular drain opening may be compared to the linear drain opening described above. The annular opening is like a linear opening that is arranged into a closed shape. An annular drain will have comparable flow cross-section and flow rate as a linear drain when the perimeter of the annular drain times the width of its opening is comparable the length of the linear drain times its width. Thus, an annular drain as defined herein may be considered a special type of sheet-flow drain as defined herein.

FIGS. 6 and 7 show the embodiment of FIG. 5 in a partial sectional view with the tub drain in two different operational states and door 124 in the closed position. Tub drain opening 134 leads to drain passage 154 of approximately same size and shape as drain opening 134. As discussed previously, the drain passage may be more or less direct or leading straight down to reservoir 130. Such a drain would exhibit an annular-flow pattern when draining, i.e. a vertical sheet of water curved into a cylindrical shell. Alternately, the annular passage may take a more tortuous route downward to the reservoir. In the embodiment of FIGS. 6 and 7, upper portion 154 of toroidal drain 151 leads to U-shaped section 153 having center divider 156 which results in enough water being retained to provide a barrier 158 between tub and reservoir. It should be understood that U-shaped section 153 is U-shaped when viewed in a vertical cross-section as shown in FIGS. 6 and 7. Lower portion 155 of the drain passage of toroidal drain 151 is again annular in shape and directs water into the reservoir in an annular flow pattern. The drain is called "toroidal" herein because the U-shaped portion holds a sort of donut-shaped body of water or generates a sort-of donut-shaped flow region.

FIG. 6 shows upper portion 154 or drain opening 134 blocked with stopper 150, thus preventing water from draining from tub 111. In FIG. 7, stopper 150 has been moved from the opening and the draining pattern illustrated is called a toroidal flow herein. Again, tub 111 drains rapidly through the toroidal drain into reservoir 130. The reservoir may then drain at a conventional rate through reservoir drain opening 132 and through conventional P-trap 131 into a sewer system. It should be understood that in constructing a toroidal drain, the central portion, indicated by reference numeral 151, must be supported in some way, e.g., by spokes or ribs connecting it to the outer portion 159. Likewise a linear drain may have support ribs as needed. Such ribs may extend across the flow cross section but should not affect the flow rate too much. Stopper 150 may be an inflatable seal.

A third embodiment of the invention is shown in FIGS. 8-11. In this embodiment, bathtub 210 again includes tub 211 with a similar access opening 222 in a sidewall as previous embodiments. The bathtub includes structural frame 236 which has leveling feet 237. Door 224 is a glass door mounted in guide rail 270 on tub front face 221 by means of rail mounting bracket 272 and fasteners 280. Door 224 extends across the entire access opening 222 in the closed position as shown, and is parallel to but set off from front face 221, for example with spacer 307. Tub drain opening 234 is the gap between door 224 and leading edge 291 of access opening 222, including both the vertical gap at the two sides of the opening and the horizontal gap at the base of the opening. Because the access opening is the drain opening, there is no need for a drain hole anywhere in the tub bottom 220. As a result, the tub bottom can be shaped in new ways, such as with a central transverse ridge for knee support, provided a slope or draft toward the access opening is maintained. The door may be raised and lowered with door actuators 274, of which there is shown one on each side of the door. Preferably the door actuators are bidirectional, effecting both opening and closing of the door. Spring 276 is provided as a safety mechanism to support the weight of the door in the event of a power failure or actuator failure and to prevent unintended lowering of the door. A spring may be provided on each side of the door, and it may be a coil spring, gas spring, or the like, or alternately some kind of latch mechanism may be used for the same purpose. Actuators and/or springs may be mounted with structures such as lower fitting 278 which may attach to guide rail 272 or frame 236, and such as upper fitting 279 which may attach to door 224. Pneumatic actuator 274 is shown with hose fittings 304 and 306 for connecting to a pressurized air supply (not shown).

In the embodiment of FIGS. 8-11, leading edge 291 of access opening 222 overhangs front face 221. This overhang provides a place to mount the primary door seal 250 out of sight of and protected from a bather. The overhang 291 may be a shaped bump as illustrated by edge profile 290 extending all around the access opening 222, allowing for manufacturability, strength, and the like. In this embodiment, edge profile 290 extends up the sides of the access opening, but not all the way to the top of door 224 or tub rim 219. Likewise primary seal 250 extends up the sides of the access opening to about the same height as the edge profile 290. Thus, if the tub is overfilled with water with the door in the closed position and the seal inflated, excess water will first run out over the top ends of profile 290 and top ends 308 of the inflatable seal 250 and not over the rim 219 of the tub or over the top of the door 224. Secondary seal 252 is a wiper-type seal that continually presses against door 224. Secondary seal 252 also extends in a larger U-shape parallel to the primary seal but below and outside it. Thus, with both primary and secondary seals mounted on the front face of the tub, there is a space or channel in between them which functions as an overflow channel when the door is in the closed position, as indicated by directional arrow 300 in FIG. 11. The secondary seal end 310 extends up the sides at least as high and preferably higher than the primary seal end 308. The overflow channel indicated by arrow 300 formed there between directs excess water that has flowed over the ends of the primary channel down toward the reservoir inlet opening 235. The overflow opening is also indicated by opening 312 in the side view of FIG. 9.

Figure 8:
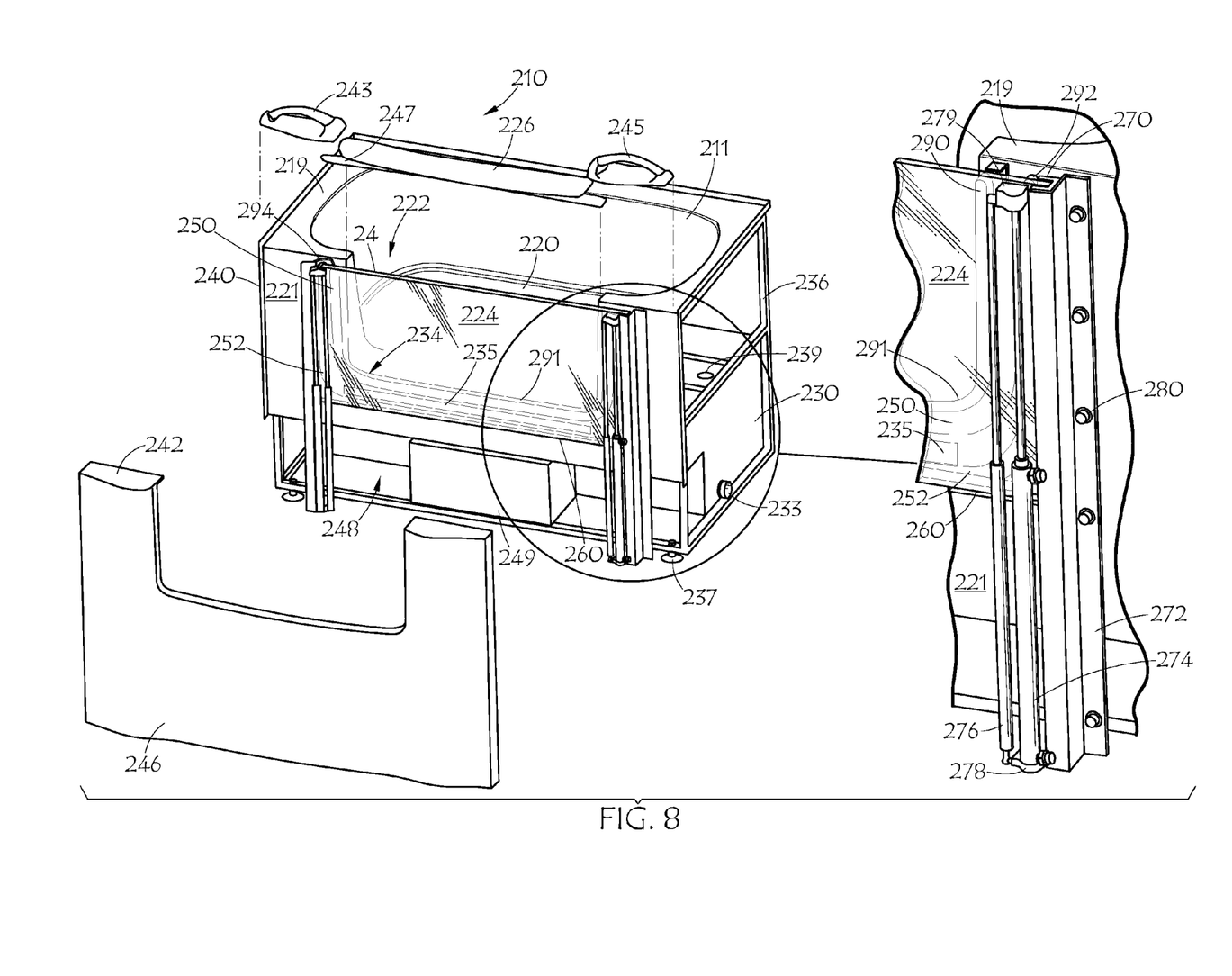
FIG. 8 is a perspective, partially exploded view of another embodiment of the invention.
Figure 9:
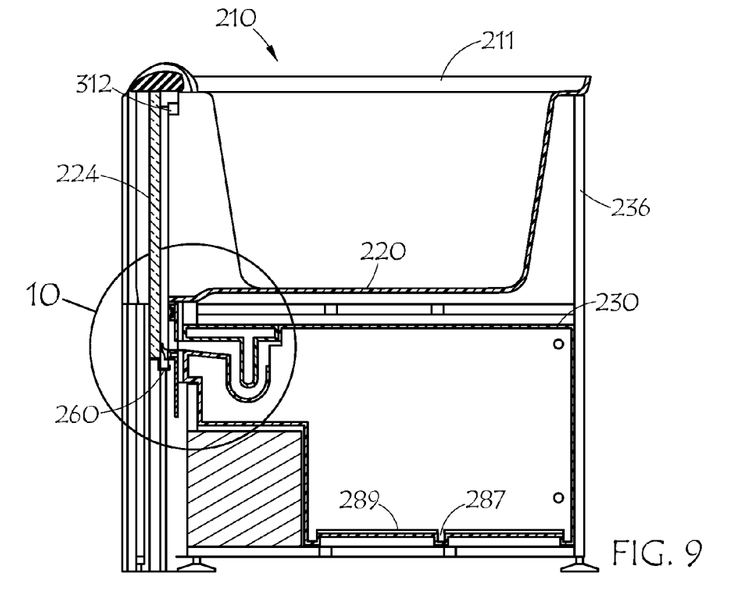
FIG. 9 is a partially fragmented side view of a section of the embodiment of FIG. 8.
Figure 10:
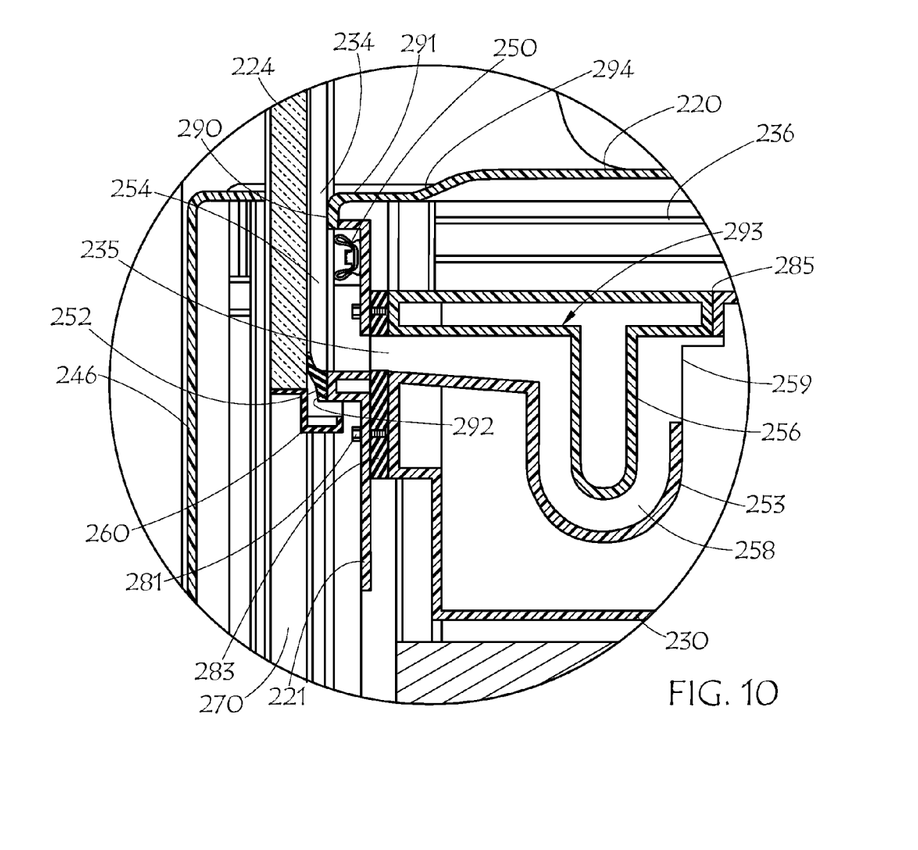
FIG. 10 is a partially fragmented enlarged view of a portion of FIG. 9.
Figure 11:
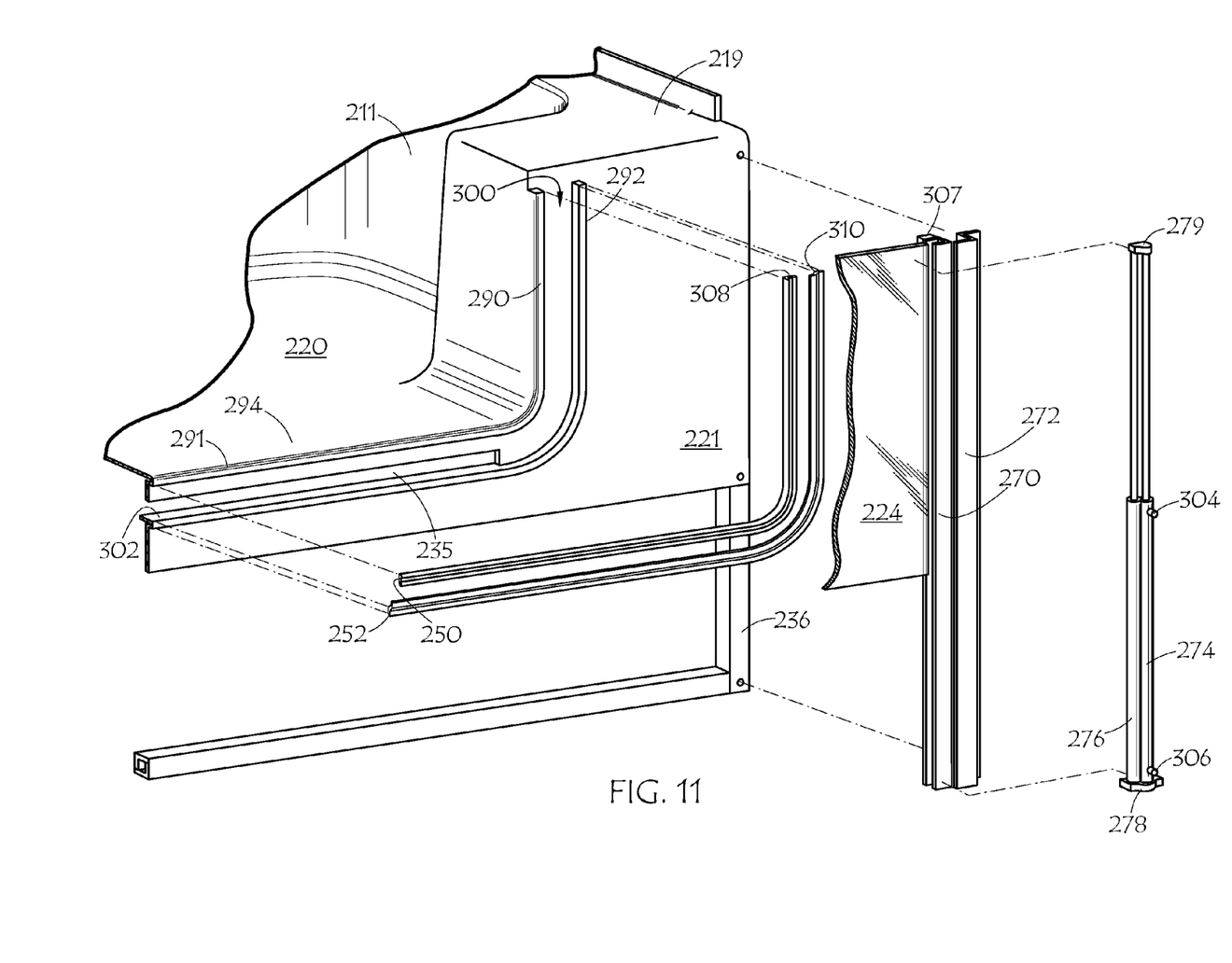
FIG. 11 is a partially fragmented, partially exploded, perspective view of parts of the embodiment of FIG. 8.

In the embodiment of FIGS. 8-11, the flow cross-section is a linear, elongated slot shape, so the flow is a linear type of sheet flow. The tub drain opening 234 leads to the upper drain passage 254, which is best illustrated in FIG. 10. The upper drain passage is bounded on its two long sides by door 224 and front face 221 and bounded on the bottom and both ends by secondary door seal 252. Secondary door seal 252 thus directs draining water into reservoir inlet opening 235, which has similar flow cross section as horizontal portion of drain opening 234, namely an elongated slot located in front face 221. Secondary door seal 252 may be a lip or wiper seal in permanent contact with the glass door. It is mounted on front face 221 parallel to and spaced apart from primary seal 250. Thus, if primary seal 250 has a U-shape, secondary seal 252 has a somewhat larger U-shape. In the embodiment shown, the secondary seal is mounted on a second bump or second profile 292, which may be adapted for manufacturability or structural support like the first profile 290. The upper horizontal surface 302 of second profile 292 and the secondary seal may be sloped to direct water toward inlet opening 235 and all may be aligned to avoid any steps or ridges that might inhibit water from flowing into the reservoir. Thus, the drain passage may include a portion passing between the two seals, and the inlet opening may be located between the two seals.

FIG. 10 shows details of the linear sheet-flow tub drain of the third embodiment. In FIG. 10 door 224 is in the closed position in track 270 and behind front panel 246, and primary seal 250 is mounted under first profile 290 and is not inflated. Secondary seal 252 is mounted on second profile 292 and is in place against glass door 224. Thus, everything is in position for rapidly draining the tub. The tub drain passage starts with drain opening 234, proceeding past the inflatable seal 250 through upper passage 254. Water then turns past secondary seal 252 and flows through reservoir inlet opening 235. The water then enters the tortuous portion of sheet-flow drain 293 which requires flowing through U-shaped portion 253 and around center divider 256, which results in enough water being retained at 258 to provide a barrier between tub and reservoir. It should be understood that U-shaped section 253 is U-shaped in cross-section and extends the length of the inlet opening 235. Each end is closed off with an end plate 259. Thus the flow cross section through this sheet-flow drain is a rectangular area or elongated slot shape comparable to inlet opening 235.

While profiles 290 and 292 and other features are shown integrally molded into the tub, it should be understood that other molding and/or assembly methods are contemplated as within the scope of the invention, whether for ease of manufacture, cost, or other reason. For example, the profiles could be molded as part of a separate plate to which the primary and secondary seals may be fastened, and then the plate assembly could be attached to the front of the tub. Alternately profiles and seals could be attached to a plate for assembly onto the tub. One reason for doing this might be to produce a sealing surface with relatively high dimensional tolerances to attach to a tub body having relatively low dimensional tolerances. Thus, any number of variations may be contemplated wherein different numbers and configurations of parts are made or molded and assembled to achieve the results and equivalent configuration of the invention described and claimed herein.

In various embodiments the drain, including those with tortuous flow passages, may be molded or formed integrally with or separately from the gray water reservoir. In the embodiment of FIGS. 8-10, sheet-flow drain 293 is a separately made article that is then fastened to reservoir 230. It may be joined by any known method, such as welds, adhesives, bolts and nuts, clamps, and the like. In FIG. 10, drain 293 is attached to the back side of front face 221 with bolts 281 and with gasket 283 sandwiched there between for a water-tight seal or joint. Drain 293 may also be welded to reservoir 230 as shown in FIG. 10 at joint 285.

In the embodiment of FIGS. 8-10, front cover panel 246 mounts on the front of bathtub 210, hiding the door operational mechanisms, the pneumatics package 249 for operation of the inflatable seals, and the like. Pneumatic supply tube 294 is shown connected to the left end of primary seal 250, but other connection locations are possible. As indicated in FIG. 8, one or more handles, such as left handle 243 and right handle 245 may be installed for use by the bather and to cover the joint between panel 246 and tub rim 219. The top edge of door 224 may be finished in various ways, such as with trim 247 and/or bolster 226. In this embodiment, bolster 226 mates with recessed portion 294 of tub bottom 220 within access opening 222, presenting a smooth transition surface for a bather entering the tub. Handles 243 and 245 may hide the joint between top surface 242 of front panel 246 and tub rim 219. Flange 240 may extend around the top edges of tub 211, and/or down the edges of front surface 221 as shown in FIG. 8. Again space 248 may be provided for additional optional equipment such as pumps, blowers, or the like.

In the embodiment of FIGS. 8-10, while a gutter as in the first two embodiments could be used, a drip tray 260 is provided instead. Drip tray 260 may be attached to the bottom of the door to catch water leaks and channels or conduits provided to direct such water to the reservoir or drain or directly to the sewer. Both a gutter and/or a drip tray or other equivalent structure may be referred to as "gutter" herein and in the claims.

It should be understood that various changes, substitutions, and alterations can be made herein without departing from the spirit and scope of the invention. For example, accessible tub disclosed herein could be adapted for portable use by mounting it on wheels, enclosing it on the back and sides as well as the front, and providing appropriate hookups for water supply and reservoir draining. It could be mounted at floor level, with the reservoir below floor level and the door going down into the floor. The door could be made to swing on hinges instead of sliding. Numerous door mechanisms in the art could be adapted for use in the present invention. Door actuators and latching mechanisms could be pneumatic, hydraulic, electronic, electro-mechanical, mechanical, or combinations thereof. In particular, the door of the second embodiment could have more conventional compression seals or the like, since the tub drain is not incorporated into the door design. The door could fit within the tub opening with seals around the door edges.

In another contemplated variation on any of the embodiments, the door could have a rigid primary seal instead of an inflatable seal, thus sealing by compression between a door surface and a tub surface. The compression could be generated by various mechanical means including angled track portions, latches, levers, or the like. The door could have three positions, closed, open and cracked. The closed and open positions would function as described for other embodiments and the cracked position would allow water to drain between the door and tub surface into the reservoir as also described above. In the cracked position, the secondary seal would remain engaged to prevent water leakage, but the primary rigid seal would be disengaged, thus opening the drain. Other combinations of rigid and inflatable and lip seals could also be contemplated. For example, both primary and secondary seals could be inflatable seals, with appropriate controls provided for operation during filling, bathing, and draining, and the like.

Likewise, various alternatives to inflatable seals could be used to stop tub drain in various embodiments of the invention. For example, a manual stopper could be used, which would be much less expensive than the inflatable seals described earlier. The manual stopper could be an external cover for the drain opening, or a insertable plug, or a mechanical closure or kit that pops up, or that goes down into the drain passage, or that flaps, swings or slides into place, or the like. Various drain stoppers could thus be applied in a linear- or annular-flow drain according to embodiments of the invention.

Various optional features useful for bathtubs could be included without departing from the scope of the invention. As nonlimiting examples, whirlpool jets, air bubblers, heaters, lights, ozone or other disinfectant devices, faucets, shower heads, hand held sprayers, bolsters, covers, pads, pillows, seats, drain screens and the like could be used with a bathtub according to the invention. The inventive bathtub could be adapted for use with various plumbing fittings including, for example, overflow fitting, vent, clean-out, or sewer fittings, or such fittings could be used with the bathtub, or adapted for use with the bathtub. Various controllers, control systems, or control sequences could be incorporated, for example to control the door, seals and drains for various bathing cycles, to control associated whirlpool equipment, blowers, heaters, lights, etc. for therapeutic cycles, purge cycles, and the like. A control system may include water sensors in tub, reservoir, etc., door position sensors, and the like. For example, in embodiments of the invention it may be advantageous to include in a control system one or more of: checks for door closure position before activating seal, check for water in reservoir indicating plugged reservoir drain, check for seal pressure before filling, check for reservoir water level before draining tub, and so on.

The invention does not depend on the materials of construction for the tub. The tub, reservoir and drain and/or components thereof may be formed of thermoplastic or thermoset composite materials, for example, and may be injection molded, compression or thermo-formed, laid up, etc. according to known molding or fabrication methods, for example with various reinforcements as necessary. The reservoir may be a plastic, metal or ceramic tank, for example. The structural frame may be metal or composite or the like. By way of example, the embodiment of FIG. 9 shows a reservoir with molded in ribs 287 and reinforcement plates 289 for improved structural integrity. The inflatable, rigid, and/or lip or wiper seals may be rubber, thermoplastic elastomer or other resilient material. For example, EPDM (ethylene propylene diene rubber) is well suited for seals. The inflator components are available commercially. Air or fluid-type inflatable seals may be used.

As noted herein, the invention may be practiced in the absence of any overflow hole or opening through a sidewall of the tub, and without any associated conventional overflow fitting. The invention may also be practiced in the absence of any conventional drain hole or opening in the bottom of the tub. The reservoir does not require a pump as it can gravity drain. The tub drains water rapidly under gravity without any power assist or pump of any kind.

The inventive bathtub may be installed with conventional sewer lines, conventional water supply, conventional electrical supply, and conventional alcove dimensions and materials. The tiling flange design may be adapted for various wall materials or water resistant panels or surround systems.

An example bathtub was constructed according to an embodiment of the invention. The example tub was a standard 5-foot long tub provided with an approximately 3-foot wide access opening and a vertically sliding glass door with an inflatable primary seal and a secondary wiper seal. A linear drain opening and passage dimensioned about ¾ inch wide and about three feet long was provided to conduct water from the tub to a reservoir underneath the tub through a drain passage like that shown in FIG. 4. Thus, the drain flow area was about 27 square inches, which is approximately nine times the flow area of a conventional 2-inch drain pipe. The tub drained into the reservoir in about 15 to 20 seconds. A comparable conventional drain and drain pipe would need to be about six inches in diameter to achieve a similar result.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A bathtub comprising:
a tub having four sidewalls, a bottom, and a water capacity;
a bather access opening in one sidewall;
a door mounted on said one sidewall and having a top edge, a closed door position adjacent said access opening, and an open door position substantially clear of said access opening;
a gray water reservoir having a volumetric capacity approximately the water capacity of the tub, and having a reservoir drain opening, and disposed lower in elevation than said tub; and
a tub drain comprising a drain opening in the tub and a drain passage that conducts water from the tub into the reservoir;
wherein the tub drain comprises an annular opening in the bottom of the tub, and said drain passage is an annular-flow passage;
wherein the door opens by sliding downward, and wherein the top edge of the door is substantially level with the bottom of the tub when in the open position; and
further comprising a gutter disposed under said door and a gutter drain connection between the gutter and the reservoir or a sewer, and wherein the door opens downward into the gutter.

2. A bathtub comprising:
a tub having four sidewalls, a bottom, and a water capacity;
a bather access opening in one sidewall;
a door mounted on said one sidewall and having a top edge, a closed door position adjacent said access opening, and an open door position substantially clear of said access opening;
a gray water reservoir having a volumetric capacity approximately the water capacity of the tub, and having a reservoir drain opening, and disposed lower in elevation than said tub; and
a tub drain comprising a drain opening in the tub and a drain passage that conducts water from the tub into the reservoir;
wherein the tub drain comprises an annular opening in the bottom of the tub, and said drain passage is an annular-flow passage;
wherein the door opens by sliding downward, and wherein the top edge of the door is substantially level with the bottom of the tub when in the open position;
further comprising at least one bidirectional door actuator operationally connected to the door; and
further comprising a door safety closure.

3. The bathtub of claim 2 wherein the door safety closure is in the form of a spring device or latch.

4. A bathtub comprising:
a tub having four sidewalls, a bottom, and a water capacity;
a bather access opening in one sidewall;
a door mounted on said one sidewall and having a top edge, a closed door position adjacent said access opening, and an open door position substantially clear of said access opening;
a gray water reservoir having a volumetric capacity approximately the water capacity of the tub, and having a reservoir drain opening, and disposed lower in elevation than said tub; and
a tub drain comprising a drain opening in the tub and a drain passage that conducts water from the tub into the reservoir;
wherein the tub drain comprises an annular opening in the bottom of the tub, and said drain passage is an annular-flow passage;
further comprising:
a primary door seal mounted between the door and the outside surface of the tub around the sides and bottom of the access opening; and
a secondary seal mounted between the door and the outside surface of the tub around the sides and bottom of the access opening and mounted approximately parallel to and spaced apart from the primary door seal.

5. The bathtub of claim 4 wherein said primary and secondary seals define a channel there between to conduct overflow water from the tub toward the reservoir.

6. The bathtub of claim 5 wherein at least one of said seals is an inflatable seal.

7. The bathtub of claim 5 wherein the primary door seal extends up the sides vertically short of the rim of the tub or top edge of the door when closed.

8. The bathtub of claim 4 wherein the primary door seal is inflatable.

* * * * *